United States Patent [19]
Wendorff

[11] Patent Number: 5,369,973
[45] Date of Patent: Dec. 6, 1994

[54] PROCESS AND DEVICE FOR BENDING TUBES WHICH CAN BE DEFORMED OR BENT

[75] Inventor: Ernst Wendorff, Taunusstein, Germany

[73] Assignee: Hans-Peter Ruppert, Germany

[21] Appl. No.: 160,462

[22] Filed: Nov. 29, 1993

Related U.S. Application Data

[63] Continuation of Ser. No. 834,339, Jan. 21, 1992, abandoned.

[51] Int. Cl.⁵ .............................................. B21D 9/01
[52] U.S. Cl. ......................................... 72/466; 72/369
[58] Field of Search ................. 425/393, 403; 72/150, 72/369, 466; 29/455.1

[56] References Cited

U.S. PATENT DOCUMENTS

| | | | |
|---|---|---|---|
| 2,497,622 | 2/1950 | Mueller | 72/213 |
| 2,908,940 | 10/1959 | Jones | 425/403 |
| 3,180,130 | 4/1965 | Avera | 72/465 |
| 3,922,134 | 11/1975 | Kupfrian . | |
| 4,009,601 | 3/1977 | Shimizu | 72/150 |
| 4,197,079 | 4/1980 | Patzner et al. . | |
| 4,916,952 | 4/1990 | Thielmann et al. | 72/466 |

FOREIGN PATENT DOCUMENTS

| | | |
|---|---|---|
| 1185729 | 2/1959 | France . |
| 80518 | 4/1963 | France . |
| 2254420 | 7/1975 | France . |
| 3307296 | 9/1983 | Germany ............................ 72/466 |
| 61-84223 | 4/1986 | Japan . |
| 881854 | 11/1961 | United Kingdom . |
| 1126421 | 9/1968 | United Kingdom . |

*Primary Examiner*—Lowell A. Larson
*Attorney, Agent, or Firm*—Gifford, Groh, Sprinkle, Patmore and Anderson

[57] ABSTRACT

The invention relates to a process for bending pipes, which preferably are deformable or bendable when heated. In this process the pipe to be bent is heated, if need be, an inside support is put in, and then the bending operation is carried out. Prior to the bending operation a pipe-like inside sleeve (3) which is expandable up to a certain degree is inserted in the pipe (1) to be Dent, and the inside sleeve (3) is filled with a pressurized medium so that it comes to rest fully against the inside wall of the pipe (1) to be bent, whereupon the bending operation takes place. The apparatus for performing the process comprises an insertable flexible pressure pipe (3) of a material that expands under pressure, the ends of this pipe being fitted with sealing parts (5, 6), the outside diameter of which is not greater than the inside diameter of the pipe (1) to be bent.

7 Claims, 3 Drawing Sheets

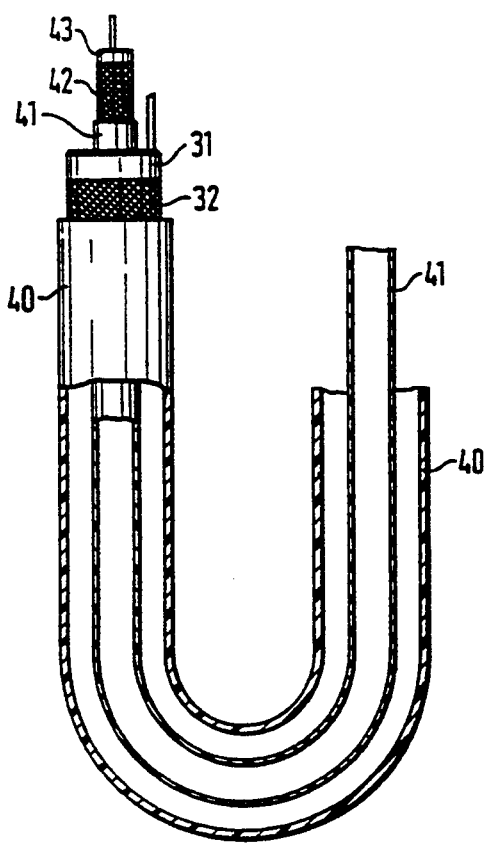
FIG. 4
FIG. 5
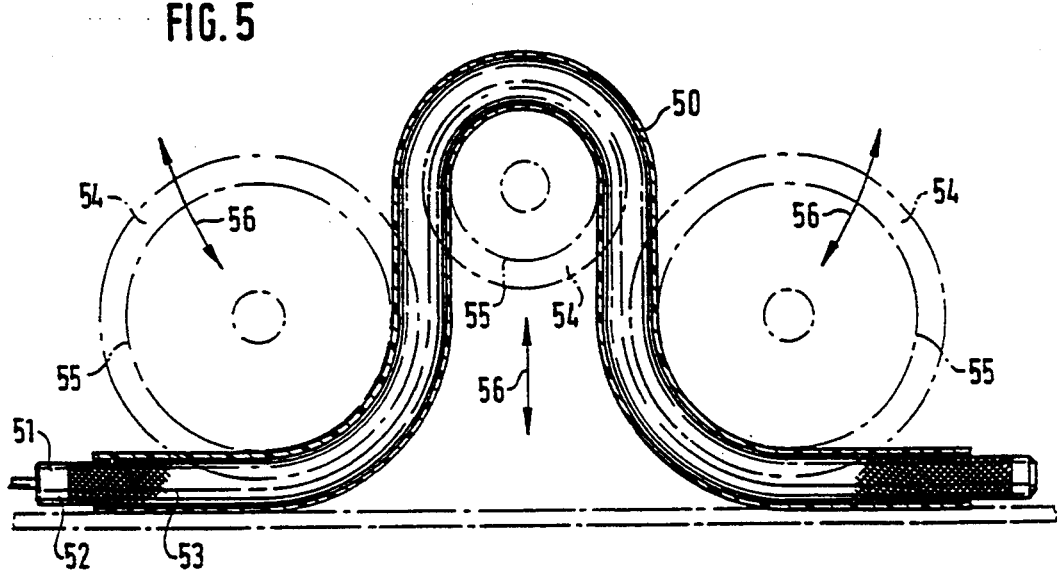

PROCESS AND DEVICE FOR BENDING TUBES WHICH CAN BE DEFORMED OR BENT

This is a continuation of copending application(s) Ser. No. 07/834,339 filed on Jan. 21, 1992, now abandoned.

BACKGROUND OF THE INVENTION

I. Field of the Invention

The invention relates to a process for bending pipes which preferably are deformable or bendable when heated, with which process the pipe to be bent is heated, if need be, an inside support is put in, and then the bending operation is carried out.

II. Description of the Prior Art

It is known to bend bendable pipes, preferably of plastic, after heating them, an inside support being inserted into the pipes to avoid their deformation, in particular kinking during the bending operation. To this end, to provide an inside support, the pipe is, for example, filled with sand. This has the disadvantage that the sand often sticks to the pipe that must be bent, and it furthermore does not ensure that the sand supports the pipe evenly over its inside surface. It is also known to pull a coil spring into the inside of the pipe prior to the bending operation so as to support it. Also the coil spring does not ensure a uniform supporting of the pipe to be bent over its inside surface, and, in particular, it entails the risk that as a result of the heating the coil spring is pressed into the soft material of the pipe to be bent, so that in the case of complicated bending operations it may no longer be possible to remove the coil spring. The known measures, in particular, do not permit the carrying out of complicated bending operations in opposite directions, which is possible only with the aid of molds.

SUMMARY OF THE PRESENT INVENTION

It is, therefore, the object of the invention to make available a process which without problems permits a bending of pipes that are deformable or bendable when heated, wherein the risk of a deformation during the bending operation is reduced, and with which also bending operations in opposite directions can be carried out without problems without the use of external support molds.

The invention consists in that prior to the bending operation a pipe-like sleeve which is expandable up to a certain degree is inserted in the pipe to be bent, and that the inside sleeve is filled with a pressurized medium so that it comes to rest fully against the inside wall of the pipe to be bent, whereupon the bending operation takes place.

An expedient method of performing the process consists in that a hose which is expandable up to a certain degree is inserted.

It is advantageous to insert as an inside sleeve an expandable hose which has a fabric or braided casing as the pressure carrier, which casing is also expandable up to a given degree.

The invention also makes available an apparatus for performing the process, which comprises a device that inserts into the pipe to be bent a pressure pipe which consists of an inside sleeve and a casing and is flexible and under pressure also expandable to the outside up to a certain degree, its ends being provided with sealing parts, the outside diameter of which is not greater than the inside diameter of the pipe to be bent.

It is expedient to provide in these sealing parts inlet bores for a pressurized medium, one inlet bore being fitted with a closing part to which a pull rope is attached.

So that with larger pipe diameters less filling fluid will be required and to get by with a smaller mass, the invention proposes as a further development that the apparatus inserts a pressure pipe which is double walled with an annular space between the walls, and that the inside wall of the pressure pipe is supported by a flexible support hose.

In a further development the inside support hose is replaced by a second pipe that must be formed into which is inserted an inside pressure pipe consisting of an inside sleeve and casing.

To bend the pipe an apparatus is provided which comprises rollers and shaped parts that correspond to the outlines of the pipe to be bent and can be moved towards one another.

BRIEF DESCRIPTION OF THE DRAWINGS

In the following the invention will be explained in greater detail with reference to the attached drawings, wherein:

FIG. 4 shows a bent double pipe;

FIG. 5 shows a roller apparatus for the bending.

DETAILED DESCRIPTION OF PREFERRED EMBODIMENTS OF THE PRESENT INVENTION

Figure 1:
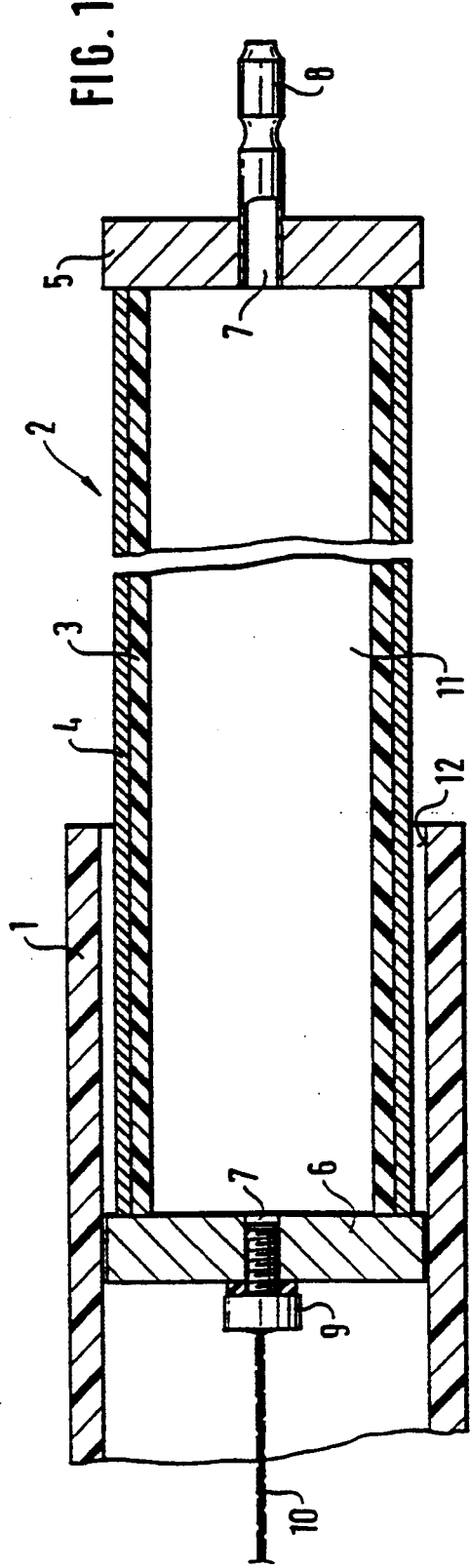
FIG. 1 shows a pipe to be bent with pressure pipe in section.

In FIG. 1 the reference numeral 1 indicates a pipe to be bent, which may be of plastic, e.g. polyethylene. In principle, the pipe 1 to be bent may be of any materials that are deformable or bendable when heated.

Shown in the figure is an apparatus 2 that consists of an expendable pressure pipe 3 which is provided with a casing 4. The casing serves as a pressure carrier, required in particular when higher pressures are used. The casing may consist of a fabric or braided casing, e.g. a steel wire braiding as used to protect hoses. A characteristic of the braided casing is that it can be expanded only up to a certain degree.

The pressure pipe 3 with its casing 4 is provided at its ends with sealing parts 5 and 6. These are fitted with inlet bores 7, through which a pressurized medium can be fed in. As a medium air, water, steam and oil can be used. To feed in the medium the one sealing part 5 has a feed connection 8, whereas the other sealing part 6 is equipped with a closing part 9 that closes off the inlet bore 7. Attached to the closing part 9 is a pull rope 10, by which the apparatus 2 can be pulled through the pipe 1 to be bent. The start of this operation is illustrated in the figure. What is important here is that the sealing parts 5 and 6 have an outside diameter which is not larger than the inside diameter of the pipe 1 to be bent. When through the feed connection 8 and the inlet bore 7 of the sealing part 5 a pressured medium is fed into the inside 11 of the pressure pipe 3, the pressure pipe 3 with its casing 4 will expand to the outside and come to rest against the inside wall 12 of the pipe to be bent. Because of the gaseous or liquid pressurized medium an all-over contact of the pressure pipe 3 with its casing 4 against the inside surface 12 of the pipe to be bent is obtained, so that during the bending no deformation of the pipe 1 can occur.

The pressurized medium which fills the inside of the pressure pipe 3 may be connected to a heat source, so that the heat is transferred from the pressure pipe 3 via the casing 4 to the pipe 1 to be bent after the pressure pipe 3 has been inserted. This avoids a separate heating operation of the pipe I to be bent. To this end it is possible, after completely inserting the pressure pipe 3 in the pipe 1 to be bent, to remove the closing part 9 from the inlet bore 7, which may be a threaded bore, and to attach a not illustrated connecting part, so that the heated pressurized medium flows continuously through the pressure pipe so as to heat the pipe 1 that must be bent.

The pressure pipe 3 makes it possible in particular during installation operations, to carry out the bending in any place without any problems and without requiring an external support mold. As a rule a pressure of 2 to 3 bar can be regarded as sufficient.
* 2 to 3 bar=(203 to 304 kPa)

Figure 2:
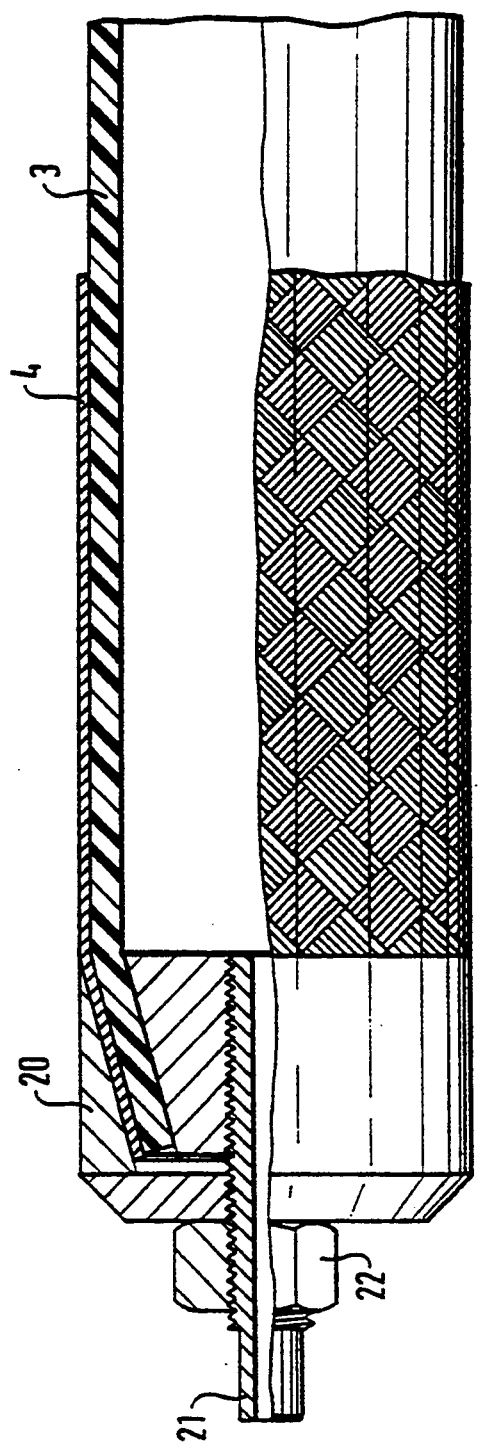
FIG. 2 shows a pressure pipe, consisting of hose and fabric casing.

FIG. 2 shows another type of pressure pipe. The braided casing 4 and the inside sleeve 3 are clamped into an end part 20 which at the same time contains the pressurized medium duct 21 and with the aid of the nut 22 permits the attaching of a pull rope. The inside sleeve 3 in the form of a flexible, heat resistant hose is surrounded by a fabric hose 4, which as a result of the internal pressure of the flexible hose 3 after the feeding in of a pressurized medium through the pressurized medium inlet 21 expands up to a degree which is chosen such that it corresponds to the inside diameter of the pipe to be bent. This is obtained by the arrangement of the braiding of the fabric hose 4 which also at a higher internal pressure is expandable only to a limited degree.

Figure 3:
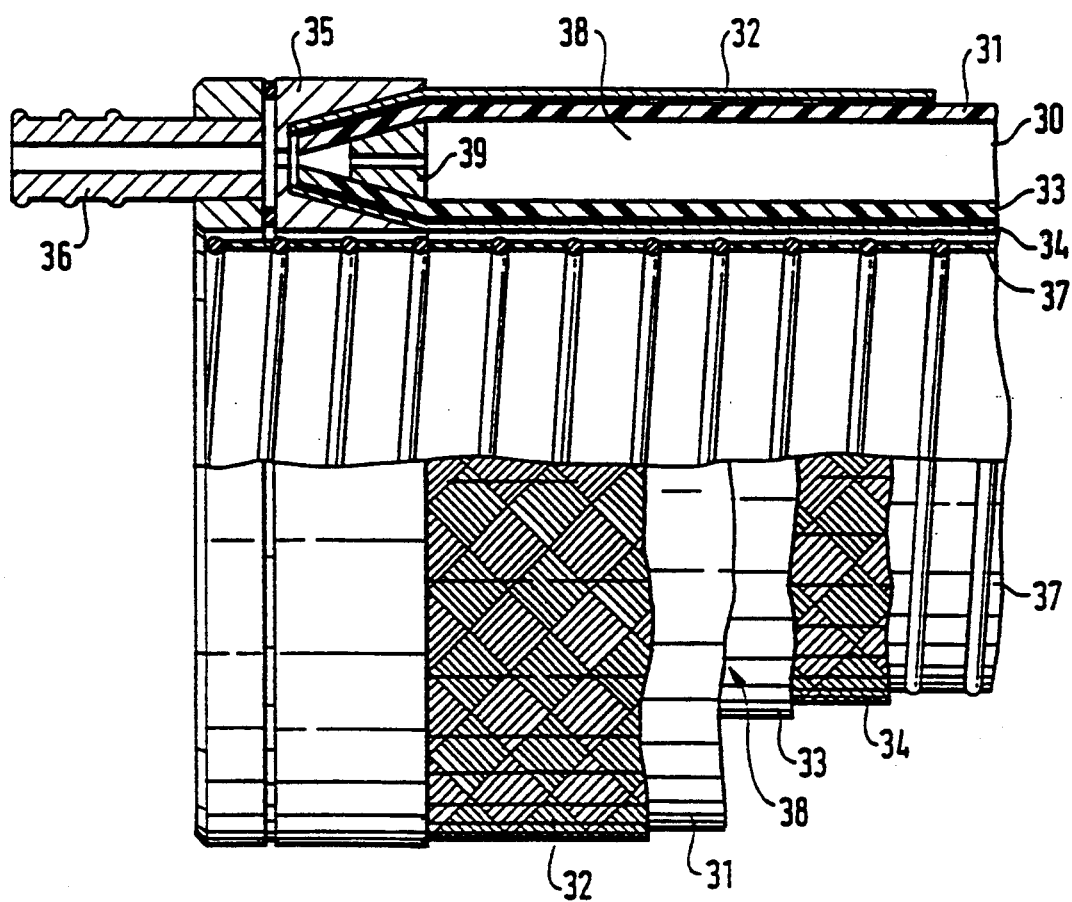
FIG. 3 shows a double-walled pressure pipe.

FIG. 3 shows a double-walled pressure pipe 30 which consists of an outer inside sleeve 31 with an outer fabric casing 32 and an inner inside sleeve 33 with an inner fabric casing 34. The outer and the inner sleeves 31 and 33, respectively, with the outer fabric casing 32 and the inner fabric casing 34, are again clamped into an end part 35 with an inner clamping cone 39 which is provided with a pressurized medium inlet 36. The inner sleeve 33 with the inner fabric casing 34 is supported by a support pipe 37. When a pressurized medium is fed through the pressurized medium inlet 36 into the annular space 38 formed by the double-walled pressure pipe 30, the outer fabric casing 32 comes to rest against the inside wall of the pipe to be bent, which pipe is not illustrated. At the same time a pressure pipe arrangement can also be inserted in the inner support pipe 37, so that a double pipe arrangement, e.g. inflow and outflow, can be bent simultaneously. As a support pipe 37 a flexible metal pipe or plastic pipe, as well as a metal spring can be used.

By this arrangement, where the greater part of the inside volume is filled out by the support pipe 37, the filling volume is reduced quite considerably as only the annular space 38 needs to be filled. This has the advantage that relatively little filling liquid is required, and the mass is reduced quite considerably.

FIG. 4 shows the bending of two pipes with a double-walled pressure pipe 30 according to FIG. 3. Adjoining the inside wall of the pipe 40 that must be bent, lies the outer braided casing 32 with the outer sleeve 31 of the double-walled pressure pipe 30. Instead of the support pipe 37 according to FIG. 3 a second pipe 41 is inserted, into which in turn a pressure pipe consisting of the braided casing 42 and an inner sleeve 43 is inserted. In the described manner it is, therefore, possible to simultaneously bend the pipe 40 with the larger diameter and the inside pipe 41 with a smaller diameter.

FIG. 5 shows an apparatus for bending a pipe 50. Inserted in the pipe 50 is a pressure pipe 51 consisting of an inner sleeve 52 and a braided casing 53. The rollers or other shaped parts 54 have outlines 55 that correspond to the outer periphery of the pipe 50 that must be bent. The rollers or shaped parts 54 can be moved relative to one another as indicated by the arrows 56. In this manner, with the aid of the inserted pressure pipe, an accurate forming can be achieved in the most varying ways, depending on the position of the shaped parts 54.

The bending process is characterized by its ease of operation, as the plastic pipe, which can be heated by the pressurized medium from the inside or outside, is supported only on the inside diameter of the pressure pipe 51 or the outer fabric casing 53, the diameter of the fabric casing 53 corresponding to the inside diameter of the pipe to be bent. After relieving the pressure from the pressure pipe 51, its diameter becomes smaller, permitting an easy pulling out of the bent pipe 50. The outside diameter of the pressure pipe 51 can be adjusted accurately by regulating the pressure. Accordingly, no shells or devices are required to support the pipe 50 from the outside. The length of the pressure pipe 51 can be adapted to the length of the pipe to be bent.

The process is suitable not only for the production of premanufactured parts in a specific workshop, but can also advantageously be used in other situations.

I claim:

1. An apparatus for bending a first pipe with a given inside diameter comprising:
    a double-walled pressure pipe extending circumferentially around the inside diameter and in a longitudinal direction of the first pipe, said double-walled pressure pipe having an inner sleeve and an outer sleeve which are arranged coaxially and which are separated by an annular space;
    a second pipe to be bent positioned within said pressure pipe, said second pipe sandwiching said double-walled pressure pipe between said second pipe and the first pipe to be bent; and
    a pressurized medium for expanding said pressure pipe;
    wherein said second pipe biases said pressure pipe against the inside diameter of the first pipe and an outside diameter of said second pipe to be bent.

2. The apparatus according to claim 1 wherein said second pipe is a flexible support pipe positioned within said pressure pipe.

3. The apparatus according to claim 1, further comprising a single-walled pressure pipe positioned against an inside diameter of said second pipe.

4. The apparatus according to claim 3 wherein said single-walled pressure pipe has an outer braided casing and an inner sleeve.

5. The apparatus according to claim 1, further comprising a plurality of rollers which sandwich said apparatus on opposite sides thereof, said rollers being movable relative to one another to assist in bending said first and second pipes.

6. An apparatus for bending a first pipe with a given inside diameter comprising:
    a double-walled pressure pipe extending circumferentially around the inside diameter and in a longitudinal direction of the first pipe;

a second pipe to be bent positioned within said pressure pipe, said second pipe sandwiching said double-walled pressure pipe between said second pipe and the first pipe to be bent;

a single-walled pressure pipe positioned against an inside diameter of said second pipe; and a pressurized medium for expanding said double-walled pressure pipe and said single-walled pressure pipe;

wherein said second pipe biases said double-walled pressure pipe against the inside diameter of the first pipe and an outside diameter of said second pipe to be bent.

7. The apparatus according to claim 6 wherein said single-walled pressure pipe has an outer braided casing and an inner sleeve.

* * * * *